Aug. 9, 1955 G. RENKEN 2,714,793
COTTON PICKING MACHINE
Filed May 14, 1952 3 Sheets-Sheet 1

Georg Renken
INVENTOR.
BY *Clarence A. O'Brien*
*and Harvey B. Jacobson*
Attorneys Aug. 9, 1955   G. RENKEN   2,714,793
COTTON PICKING MACHINE
Filed May 14, 1952   3 Sheets-Sheet 2

Georg Renken
INVENTOR.

BY
Attorneys

Aug. 9, 1955  G. RENKEN  2,714,793
COTTON PICKING MACHINE
Filed May 14, 1952  3 Sheets-Sheet 3
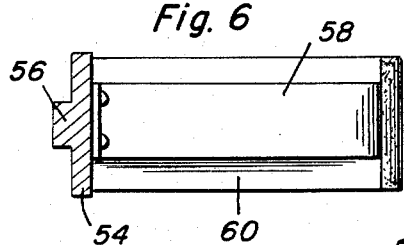
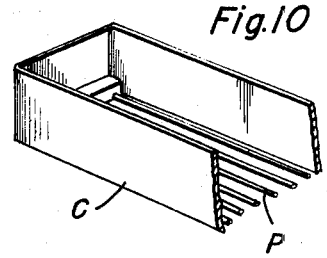
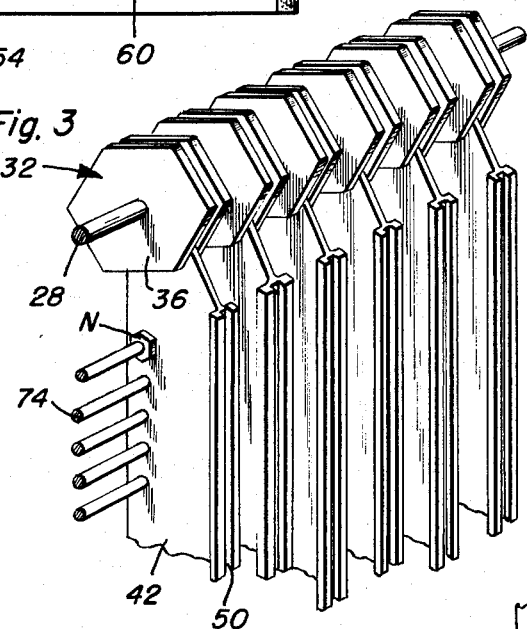
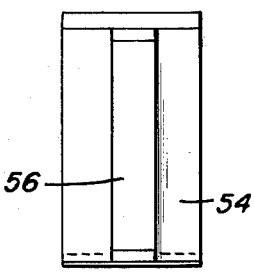
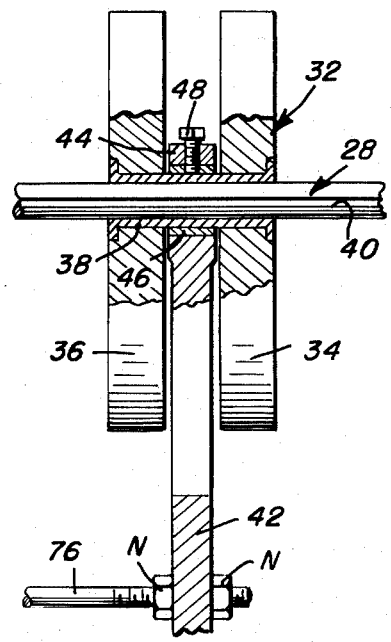
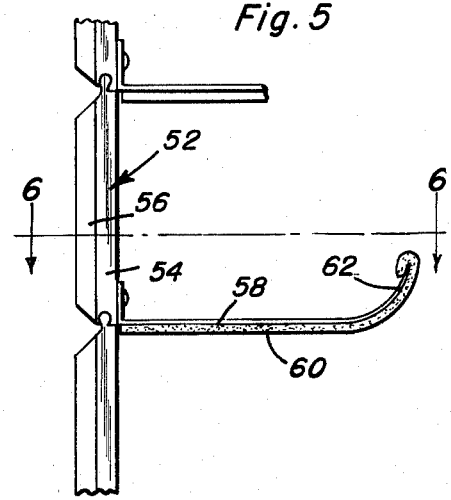
Georg Renken
INVENTOR.
BY *Lawrence A. O'Brien*
*and Harvey B. Jacobsen*
Attorneys United States Patent Office 2,714,793
Patented Aug. 9, 1955

2,714,793

COTTON PICKING MACHINE

Georg Renken, Corpus Christi, Tex.

Application May 14, 1952, Serial No. 287,682

3 Claims. (Cl. 56—33)

This invention relates to new and useful improvements in cotton harvesters and the primary object of the present invention is to provide a cotton picker composed of relatively adjustable side by side endless picking elements that will pass upwardly through cotton stalks to pick open bowls and permit the unopened green bowls to remain unpicked until such time as they become open and ready for picking.

Another important object of the present invention is to provide a cotton picking machine including a pair of housing halves that are slidable toward and away from each other so that endless side by side picker elements in each half may be spaced apart a predetermined distance by selectively moving the housing halves toward and away from each other.

A further object of the present invention is to provide a cotton picking machine of the aforementioned character wherein the side by side picking elements of each half are connected together by a mechanism whereby the elements may be moved as a unit toward or away from each other to vary the spacing between adjacent picking elements of each half, thereby providing a machine capable of picking open bowls without harming unopen bowls.

A still further aim of the present invention is to provide a cotton picking machine that is extremely simple and practical in construction, strong and reliable in use, efficient and durable in operation, small and compact in structure, inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 3 is a fragmentary perspective view of one of the picker element holders and support;

Figure 4 is an enlarged fragmentary view of Figure 3 partly in section and partly in elevation;

Figure 5 is an enlarged fragmentary view of Figure 1;

Figure 6 is a horizontal sectional view taken substantially on the plane of section line 6—6 of Figure 5;

Figure 7 is a plan view of one of the picker element links used in the invention;

Figure 1:
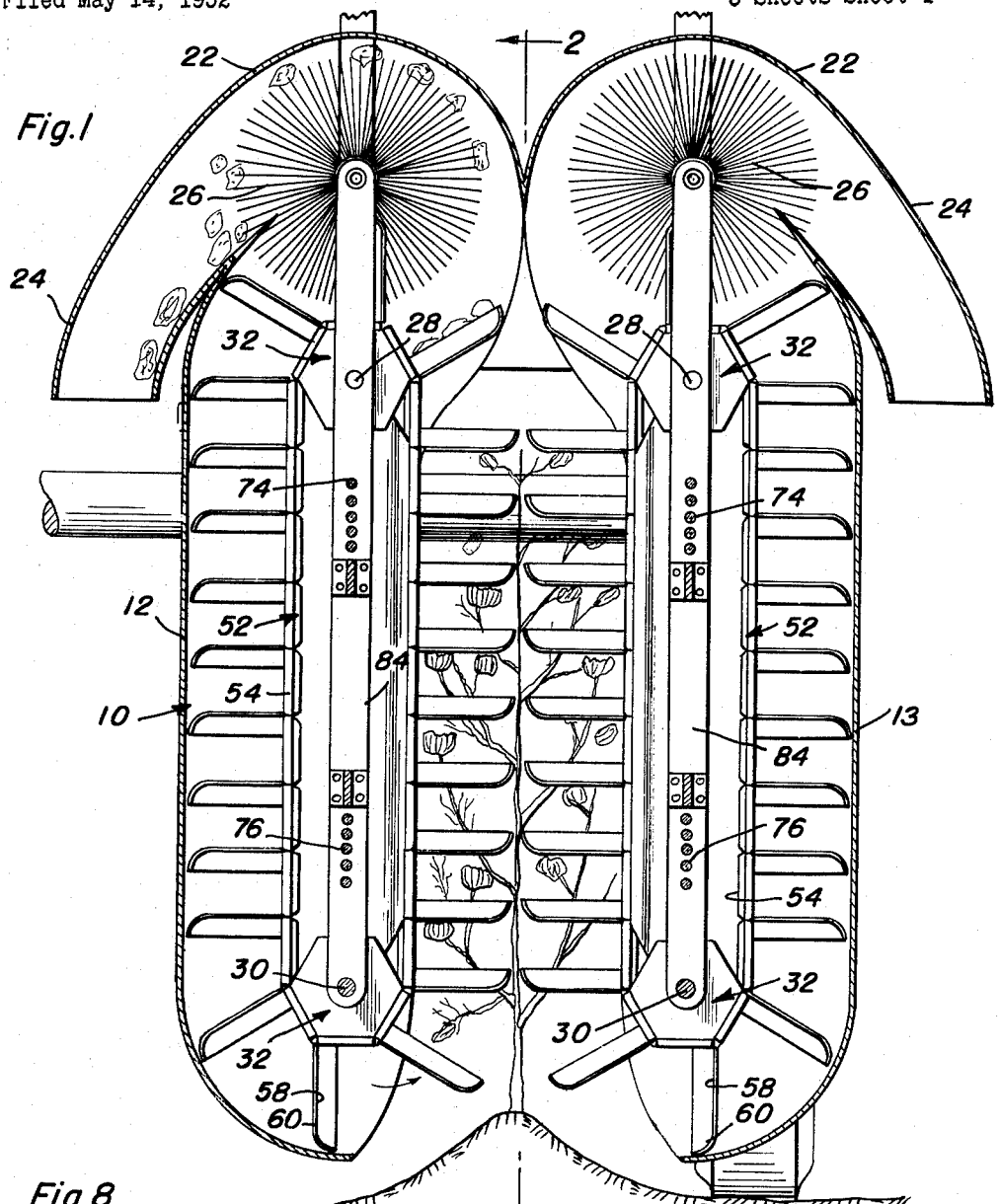
Figure 1 is a vertical sectional view of the present invention taken substantially on the plane of section line 1—1 of Figure 2.

Referring now to the drawings in detail, wherein for the purpose of illustration, there is disclosed a preferred embodiment of the present invention, the numeral 10 represents a housing composed of two separable sections of halves 12 and 13. The halves 12 and 13 and the respective component parts thereof are merely images of each other in view of their similarity, like reference characters are used to designate similar parts throughout the several views. The vertical forward and rear walls 14 and 16 of the halves 12 and 13 are formed with vertical openings 18 and 20 that register with each other to permit the housing 10 to straddle and pass over cotton stalks.

The upper smoothly rounded end portions 22 of the housing halves 12 and 13 are provided with downwardly and outwardly extending rigid conduit sections or discharge spouts 24. Horizontally disposed brushes 26 are rotatably supported in the portions 22 for a purpose later to be more fully described.

Upper and lower spaced parallel shafts 28 and 30 are rotatably supported by each half 12 and 13 and parallel the brushes 26. Pulley members 32, see Figure 4, are slidably keyed on the shafts 28, 30 and include spaced parallel multisided walls 34 and 36 that are connected by hub-forming sleeves 38 having internal ribs for entering key-ways 40 in the shafts 28, 30.

Guide walls 42 connect the pulley members 32 on the shafts 28 to the pulley members 32 on the shafts 30. The ends of the walls 42 are formed with eyes 44 that hold bearings 46 accommodating the central portions of the sleeves 38. Set screws 48 carried by the eyes 44 engage the central portions of bearings 46 to hold the walls 42 to the bearings 46 on the upper and lower shafts. The inner vertical edges of the walls 42 are formed with vertical guide channels 50 that slidably receive the inner flights of vertically disposed endless picker elements 52 forming endless picker chains.

The picker elements 52 are arranged in a first group thereof and in a second group thereof mounted in the first and second separable sections of halves 12 and 13. Picker elements 52 are composed of pivotally connected links 54 having ribs 56 on their inner faces for slidably engaging the channels 50. The flanged ends of resilient picking fingers 58 are secured to the outer faces of the links 54 and the links are disposed perpendicular to the fingers. Resilient strips 60 are secured to the fingers 58 and extend over the curved free ends 62 of the fingers. The strips 60 are wider than the fingers to provide flexible edges for engaging cotton bowls.

Means is provided for moving the side by side endless picking elements in each half 12 and 13 selectively toward and away from each other. This means comprises upper and lower vertically swingable links 64 and 66 whose adjacent ends are pivoted together by horizontal pivots 68. The links 64 and 66 are vertically swingably mounted on brackets 70 and 72, respectively, on the forward walls of halves 12 and 13.

An upper group of spaced parallel horizontally disposed rods 74 are slidably carried by the walls 14 and their forward ends are pivotally attached to the links 64. A lower group of spaced parallel rods 76 are slidably carried by the walls 14 and their forward ends are pivotally attached to the links 66.

The rods 74 are progressively increased in length from the uppermost of the rods 74 to the lowermost of the rods 74, whereas the rods 76 are progressively reduced in length from the uppermost of the rods 76 to the lowermost of the rods 76. The rods 74 are arranged in pairs with the rods 76 with the upper of the rods 74 and the lower of the rods 76 attached by clamp nuts N to the wall 42 between the pulley members 32 on the shafts 28 and 30 closest to walls 14; the next lower rod 74 and the next upper rod 76 connected by clamp nuts to the wall 42 between the second upper and lower pulley members on shafts 28 and 30; the third lower rod of rods 74 and the third upper rod of the rods 76 connected by clamp nuts N to the wall 42 between the third upper and lower pulley members on shafts 28 and 30; the fourth lower rod of the rods 74 and the fourth upper rod of the rods 76 connected to the wall 42 between the fourth upper and lower pulley members on shafts 28 and 30; and, with the lower rod of rods 74 and the upper rod of rods 76 connected to the wall 42 between the last or rearmost pulley members on shafts 28 and 30.

Obviously, any suitable number of pulley members and rods attached thereto may be utilized. Actuating rods 78 are attached to the upper links 64 and when actuated adjacent walls 42 in the housing halves 12 and 13 will be moved selectively toward or away from each other due to movement of links 64 and 66. Direction of movement will depend upon whether or not the rod 78 is pulled or pushed.

Figure 8:
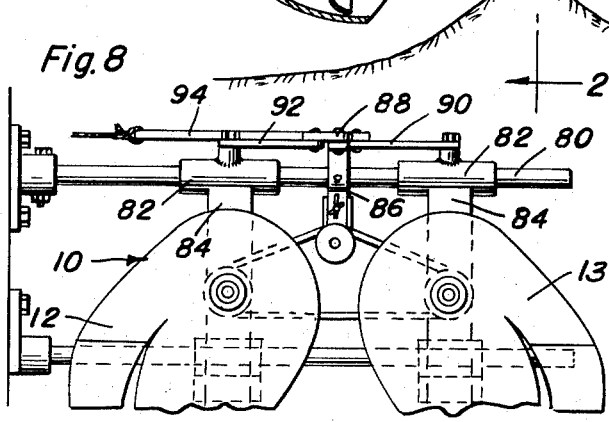
Figure 8 is a fragmentary front elevational view of the invention, in reduced scale, and showing the mechanism for moving the housing forming halves selectively toward and away from each other.
Figure 2:
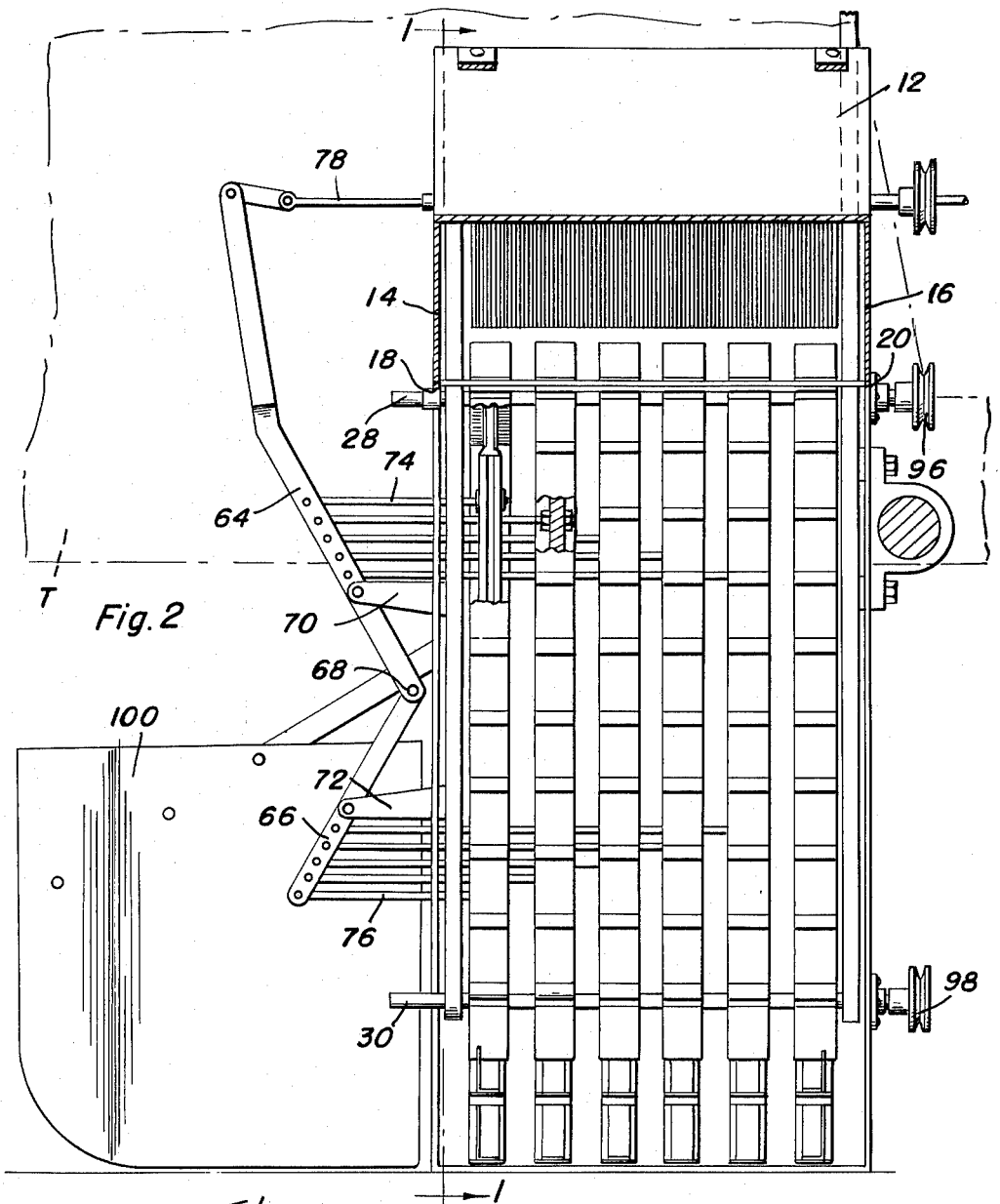
Figure 2 is a vertical sectional view taken substantially on the plane of section line 2—2 of Figure 1.
Figure 9:
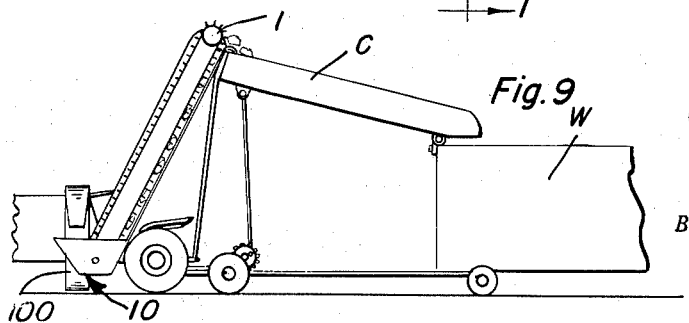
Figure 9 is a fragmentary side elevational view of the present invention and the apparatus it is used with in harvesting cotton; and, Figure 10 is an enlarged fragmentary perspective view of the guide chute used in the invention.

Means is provided for mounting the housing 10 on the side of a vehicle, such as a tractor T, as shown in Figure 9. This means comprises a horizontal support or rod 80, see Figure 8, that slidably supports sleeves 82 fixed to the upper ends of halves 12 and 13 or to vertical straps 84 that are attached to the housing halves and which support the shafts 28, 30 and the shafts for brushes 26.

A bracket 86 is centrally attached to the rod 80 between and spaced from the sleeves 82. A horizontally swingable link 88 is centrally pivoted to bracket 86. One end of link 88 is connected by a pitman 90 to one of the sleeves 82 and the other end of link 88 is connected by a pitman 92 to the other sleeve 82. An acuating bar 94 is pivoted to one end of link 80 and is connected to a suitable operating lever by any means, whereby movement of the bar 94 in one direction will move the housing halves 12 toward each other and movement of the bar 94 in an opposite direction will move the housing halves apart.

Obviously additional rods 80 and sleeves 82 may be employed to prevent vertical swinging movement of the housing 10 or suitable means may be provided for this function, as the housing is to remain vertical as it is moved over the plants with the tractor.

The rear ends of the shafts 28 and 30 carry pulleys 96 and 98 that are suitably operatively connected to a source of power such as the power take-off shaft of the tractor to rotate the shafts 28 and 30 of the half remote from the tractor side clockwise and the shafts 28 and 30 of the half 12 or 13 closest the tractor counter clockwise, as shown in Figure 1, so that the fingers on the inner flights of all picking elements will move upwardly to pick the open cotton bowls and carry the bowls through the brushes 26 or to the brushes 26 suitably connected to the power take-off of the tractor and which will brush and carry the bowls to the discharge spouts 24.

A wagon W hitched to and trailing the tractor T is provided with a shute C having a lower foraminous bottom wall portion P, the chute underlies the outlet end of a conveyor I supported on the tractor. The intake end of the conveyor is coupled to the spouts 24 to carry the bowls upwardly and direct the same to the chute to subsequently pass into the wagon W.

The shafts 28 and 30 may be driven in any suitable manner although the drive connections cannot extend across the openings 18 and 20 to block the cotton stalks.

Confiner plates 100 are secured to and extend forwardly from the walls 14 and guide the stalks into the openings 18 and toward the various picking elements.

Although but a single unit 10 is referred to, it is apparent that one such unit may be mounted on each side of the tractor. The units being similar in construction and operation.

Having described the invention, what is claimed as new is:

1. A cotton picking machine comprising a housing member adapted to be propelled over a cotton field and including forward and rear walls having registering openings therein to permit the housing to straddle and pass over cotton plants, an upper pair of spaced parallel horizontal shafts rotatably supported by said walls, a lower pair of spaced parallel horizontal shafts also rotatably supported on said walls, a first group of horizontally spaced vertically disposed endless picker elements engaged over one of the upper shafts and one of the lower shafts, a second group of horizontally spaced vertically disposed endless picker elements engaged over the remaining upper and lower shafts, said housing member being composed of two separable halves which are separated along said openings, a horizontal support rod disposed perpendicular to the shafts and slidably supporting the halves, and means connected to the halves for selectively moving the halves toward and away from each other to space the elements of one group a predetermined distance from the elements of the other group.

2. A cotton picking machine comprising a horizontal support adapted to be mounted on a vehicle, a housing member composed of separable halves slidably mounted on the support and having forward and rear openings to straddle and pass over cotton plants, means connected to the halves for selectively moving the same toward and away from each other, upper and lower horizontal shafts disposed perpendicular to the support and rotatably supported by each half, a plurality of pulley members keyed on each shaft, vertical walls connecting the pulley members on the upper shafts to the pulley members on the lower shafts, guides on said vertical walls, endless picker chains engaged over the pulley members on the upper and lower shafts and slidably received by the guides, and independently actuatable means carried by each half and connected to the walls connecting the pulleys in each half for moving the walls of each half toward or away from each other.

3. A cotton picking machine comprising a horizontal support adapted to be mounted on a vehicle, a housing member composed of separable halves slidably mounted on the support and having forward and rear openings to straddle and pass over cotton plants, means connected to the halves for selectively moving the same toward and away from each other, upper and lower horizontal shafts disposed perpendicular to the support and rotatably supported by each half, a plurality of pulley members keyed on each shaft, vertical walls connecting the pulley members on the upper shafts to the pulley members on the lower shafts, guides on said vertical walls, endless picker chains engaged over the pulley members on the upper and lower shafts and slidably received by the guides, upper and lower pivotally connected vertically swingable links carried by each half, upper and lower groups of spaced parallel horizontally disposed rods slidably carried by each half, said upper rods being attached to said upper link and said lower rods being attached to said lower link, said upper rods being arranged in pairs with the lower rods, said pairs of rods being attached to different vertical walls, whereby actuation of said links will effect movement of the vertical walls toward or away from each other.

References Cited in the file of this patent

UNITED STATES PATENTS

| | | |
|---|---|---|
| 1,147,961 | Matlock | July 27, 1915 |
| 1,589,340 | Rodgers | June 15, 1926 |
| 1,664,924 | Helton | Apr. 3, 1928 |
| 1,750,536 | McDonald | Mar. 11, 1930 |
| 1,763,646 | Callahan | June 17, 1930 |
| 1,778,587 | Crumley | Oct. 14, 1930 |
| 2,438,393 | Hamner et al. | Mar. 23, 1948 |